(12) United States Patent
Kuroda et al.

(10) Patent No.: US 11,938,972 B2
(45) Date of Patent: Mar. 26, 2024

(54) VEHICLE CONTROLLER AND METHOD FOR CONTROLLING VEHICLE

(71) Applicant: TOYOTA JIDOSHA KABUSHIKI KAISHA, Toyota (JP)

(72) Inventors: Ryusuke Kuroda, Tokyo-to (JP); Takuya Fujiki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 17/344,366

(22) Filed: Jun. 10, 2021

(65) Prior Publication Data
US 2021/0387651 A1    Dec. 16, 2021

(30) Foreign Application Priority Data
Jun. 15, 2020    (JP) .................. 2020-103197

(51) Int. Cl.
| | | |
|---|---|---|
| *B60W 30/16* | (2020.01) |
| *B60W 30/14* | (2006.01) |
| *B60W 40/04* | (2006.01) |
| *B60W 40/06* | (2012.01) |
| *B60W 40/105* | (2012.01) |
| *B60W 60/00* | (2020.01) |
| *G08G 1/00* | (2006.01) |
| *G08G 1/16* | (2006.01) |

(52) U.S. Cl.
CPC ........ *B60W 60/0027* (2020.02); *B60W 40/04* (2013.01); *B60W 40/06* (2013.01); *B60W 40/105* (2013.01); *B60W 2420/403* (2013.01); *B60W 2552/00* (2020.02); *B60W 2554/80* (2020.02)

(58) Field of Classification Search
None
See application file for complete search history.

(56) References Cited

U.S. PATENT DOCUMENTS 9,272,711 B1 *   3/2016  Sivaraman ........ B60W 50/0097
2012/0123660 A1 * 5/2012  Kagawa ............... G08G 1/0112
                                                 701/96
(Continued)

FOREIGN PATENT DOCUMENTS

EP     2 075 493 A2   7/2009
JP     H10-044826 A   2/1998
(Continued)

OTHER PUBLICATIONS

See Espacenet Translation of JP 2011031675 A, Yanagiuchi, 2011, pp. 1-7 (Year: 2011).*

(Continued)

*Primary Examiner* — Adam D Tissot
*Assistant Examiner* — Michael T Silva
(74) *Attorney, Agent, or Firm* — Oliff PLC (57) ABSTRACT

A vehicle controller for automated driving control of a vehicle in traffic congestion includes a processor configured to sense at least one another vehicle around the vehicle, based on a sensor signal obtained by a sensor for sensing a situation around the vehicle, the sensor being mounted on the vehicle; calculate a motion value indicating motion of the sensed at least one other vehicle; determine, when the motion value satisfies a congestion relief condition, that congestion is relieved around the vehicle; and set the congestion relief condition, based on road environment information indicating environment of a road around the vehicle.

12 Claims, 7 Drawing Sheets

(56) References Cited

U.S. PATENT DOCUMENTS

| | | | |
|---|---|---|---|
| 2013/0311076 A1* | 11/2013 | Mieth | G08G 1/0112 |
| | | | 701/119 |
| 2017/0225567 A1 | 8/2017 | Tsuda | |
| 2017/0229015 A1* | 8/2017 | Shimamori | G08G 1/09675 |
| 2019/0113914 A1* | 4/2019 | Abe | B60W 50/08 |
| 2019/0276028 A1* | 9/2019 | Toda | B60W 50/0097 |
| 2019/0354108 A1* | 11/2019 | Okajima | B62D 15/0255 |
| 2020/0074848 A1* | 3/2020 | Namba | G06V 20/56 |

FOREIGN PATENT DOCUMENTS

| | | | | |
|---|---|---|---|---|
| JP | 2005-235105 A | | 9/2005 | |
| JP | 2009-156420 A | | 7/2009 | |
| JP | 2011031675 A | * | 2/2011 | |
| JP | 2014-006696 A | | 1/2014 | |
| JP | 2014098342 A | * | 5/2014 | |
| JP | 2015-108955 A | | 6/2015 | |
| JP | 6239144 B2 | | 11/2017 | |
| JP | 2019028000 A | * | 2/2019 | |
| WO | WO-2013060530 A1 | * | 5/2013 | B60W 30/12 |

OTHER PUBLICATIONS

See Espacenet Translation of JP 2019028000 A, Yoshinari, 2019, pp. 1-12 (Year: 2019).*
See Espacenet Translation of WO 2013060530 A1, Hillenbrand, pp. 1-14 (Year: 2013).*
See Espacenet Translation of JP-2014098342-A, Kishigami, 2014, pp. 1-18 (Year: 2014).*

* cited by examiner

VEHICLE CONTROLLER AND METHOD FOR CONTROLLING VEHICLE

FIELD

The present invention relates to a vehicle controller and a method for automated driving control of a vehicle.

BACKGROUND

A Technique has been researched for determining whether traffic is congested around a vehicle and controlling the vehicle when traffic is congested therearound (see, e.g., Japanese Unexamined Patent Publication No. 2015-108955).

For example, Japanese Unexamined Patent Publication No. 2015-108955 describes a technique in which a drive support device determines that a road is congested, when received road traffic information is congestion information and speed information of a host vehicle indicates a speed not greater than a predetermined speed. Additionally, the drive support device determines that congestion of a road is relieved when a distance from a leading vehicle is not detected after determining that the road is congested.

SUMMARY

According to the above-described technique, failure to determine that congestion is relieved after actual relief thereof will result in continuous application of control applied to the vehicle during occurrence of congestion, even after relief thereof. In contrast, erroneous determination that congestion is relieved during occurrence thereof will result in failure to execute control that should be applied to the vehicle during occurrence of congestion, causing an unnecessary burden on the driver.

It is an object of the present invention to provide a vehicle controller that can appropriately determine whether congestion is relieved.

According to an embodiment, a vehicle controller for automated driving control of a vehicle in traffic congestion is provided. The vehicle controller includes a processor configured to sense at least one another vehicle around the vehicle, based on a sensor signal obtained by a sensor for sensing a situation around the vehicle, the sensor being mounted on the vehicle; calculate a motion value indicating motion of the sensed at least one other vehicle; determine, when the motion value satisfies a congestion relief condition, that congestion is relieved around the vehicle; and set the congestion relief condition, based on road environment information indicating environment of a road around the vehicle.

Preferably, the road environment information includes information indicating a structure of a road around the vehicle, and the processor of the vehicle controller relaxes the congestion relief condition for the case that a congestion inducing location where a structure of the road induces congestion is located in a predetermined section including the vehicle, as compared to the congestion relief condition for the case that the congestion inducing location is outside the predetermined section.

In this case, the processor preferably relaxes the congestion relief condition for the case that a location where the road merges or branches, a location of a way in and out or a tollgate facing the road, or a location where the road widens is located as the congestion inducing location in the predetermined section, as compared to the congestion relief condition for the case that the congestion inducing location is outside the predetermined section.

Alternatively, the processor preferably relaxes the congestion relief condition from when the vehicle passes an event location until the vehicle travels a predetermined distance or a predetermined time elapses, as compared to the congestion relief condition before the vehicle reaches the event location, the event location being a location where a predetermined event which causes at least part of the road to be obstructed has occurred.

Preferably, the processor of the vehicle controller calculates, as the motion value, an average of vehicle speeds or accelerations of the sensed at least one other vehicle, and determines that the congestion relief condition is satisfied, when the average of vehicle speeds is kept not less than a predetermined speed threshold for a predetermined time or more or when the average of accelerations is not less than a predetermined acceleration threshold; and when the congestion relief condition is relaxed, the processor decreases at least one of the predetermined speed threshold and the predetermined acceleration threshold or shortens the predetermined time as compared to when the congestion relief condition is not relaxed.

According to another embodiment, a method for automated driving control of a vehicle in traffic congestion is provided. The method includes sensing at least one another vehicle around the vehicle, based on a sensor signal obtained by a sensor for sensing a situation around the vehicle, the sensor being mounted on the vehicle; calculating a motion value indicating motion of the sensed at least one other vehicle; determining, when the motion value satisfies a congestion relief condition, that congestion is relieved around the vehicle; and setting the congestion relief condition, based on road environment information indicating environment of a road around the vehicle.

The vehicle controller according to the present invention has an advantageous effect of being able to appropriately determine whether congestion is relieved.

DESCRIPTION OF EMBODIMENTS

Hereinafter, a vehicle controller and a method for controlling a vehicle executed by the vehicle controller will be described with reference to the accompanying drawings. The vehicle controller executes automated driving control of a host vehicle in traffic congestion. For this purpose, the vehicle controller determines whether traffic is congested around the vehicle, based on, for example, motion of vehicles sensed using a sensor signal obtained by a sensor mounted on the host vehicle. Upon relief of congestion around the host vehicle, the vehicle controller shifts the applied driving mode from automated driving mode, in which the vehicle controller controls travel of the vehicle, to manual driving mode, in which the driver controls travel of the vehicle. To this end, the vehicle controller sets a congestion relief condition that a motion value indicating motion of vehicles around the host vehicle should satisfy when congestion is relieved, based on information indicating road environment around the host vehicle, allowing for appropriate determination whether congestion is relieved.

Figure 1:
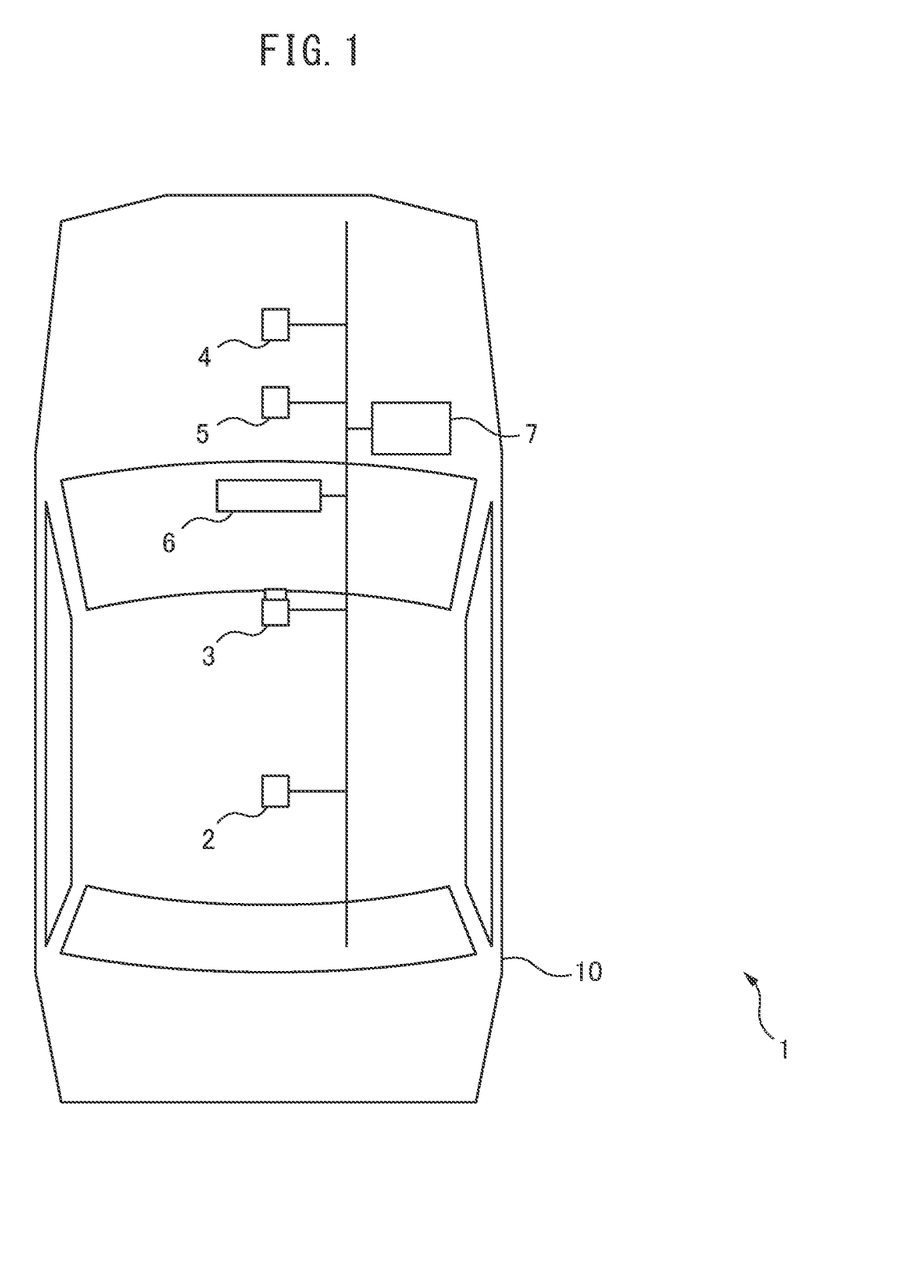
FIG. 1 schematically illustrates the configuration of a vehicle control system including a vehicle controller.
Figure 2:
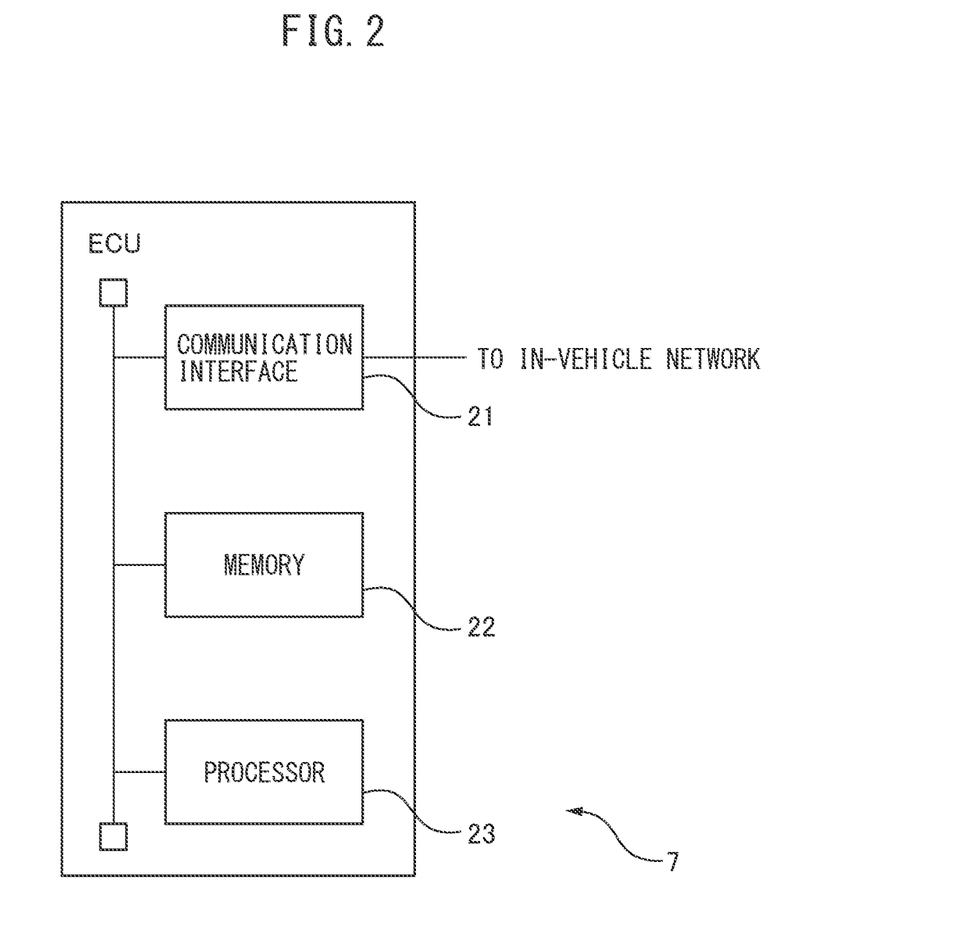
FIG. 2 illustrates the hardware configuration of an electronic control unit, which is an embodiment of the vehicle controller.

FIG. 1 schematically illustrates the configuration of a vehicle control system including a vehicle controller. FIG. 2 illustrates the hardware configuration of an electronic control unit, which is an embodiment of the vehicle controller. In the present embodiment, the vehicle control system 1, which is mounted on a host vehicle 10 and controls the vehicle 10, includes a GPS receiver 2, a camera 3, a wireless communication device 4, a storage device 5, a user interface 6, and an electronic control unit (ECU) 7, which is an example of the vehicle controller. The GPS receiver 2, the camera 3, the wireless communication device 4, the storage device 5, and the user interface 6 are connected to the ECU 7 so that they can communicate via an in-vehicle network conforming to a standard, such as a controller area network. The vehicle control system 1 may further include a distance sensor (not illustrated), such as LiDAR or radar, which measures the distance from the vehicle 10 to an object around the vehicle 10. Such a distance sensor is an example of a sensor for sensing a situation around the vehicle 10. The vehicle control system 1 may further include a navigation device (not illustrated) for searching for a planned travel route to a destination.

The GPS receiver 2 receives a GPS signal from a GPS satellite every predetermined period, and determines the position of the vehicle 10, based on the received GPS signal. The GPS receiver 2 outputs positioning information indicating the result of determination of the position of the vehicle 10 based on the GPS signal to the ECU 7 via the in-vehicle network every predetermined period. The vehicle 10 may include a receiver conforming to a satellite positioning system other than the GPS receiver 2. In this case, the receiver determines the position of the vehicle.

The camera 3, which is an example of a sensor for sensing a situation around the vehicle 10, includes a two-dimensional detector constructed from an array of optoelectronic transducers, such as CCD or C-MOS, having sensitivity to visible light and a focusing optical system focusing an image of a target region on the two-dimensional detector. The camera 3 is mounted, for example, in the interior of the vehicle 10 so as to be oriented, for example, to the front of the vehicle 10. The camera 3 captures a region in front of the vehicle 10 every predetermined capturing period (e.g., 1/30 to 1/10 seconds), and generates images in which the region is captured. The images obtained by the camera 3, each of which is an example of the sensor signal, may be color or gray images. The vehicle 10 may include multiple cameras taking pictures in different orientations or having different focal lengths.

Every time generating an image, the camera 3 outputs the generated image to the ECU 7 via the in-vehicle network.

The wireless communication device 4 communicates with a wireless base station by wireless in conformity with a predetermined standard of mobile communications. The wireless communication device 4 receives, from another device via the wireless base station, traffic information indicating a traffic situation of the road on which the vehicle 10 is traveling or of the neighborhood thereof, e.g., information provided by the Vehicle Information and Communication System (VICS [registered trademark]), and outputs the traffic information to the ECU 7 via the in-vehicle network. The traffic information includes, for example, information on the presence or absence of road construction, an accident, or traffic restrictions, and the places and times of day at which the road construction is carried out, the accident occurred, or the traffic restrictions are imposed. The wireless communication device 4 may receive a high-precision map of a predetermined region around the current position of the vehicle 10 from a map server via the wireless base station, and output the received map to the storage device 5. The high-precision map is used for automated driving control.

The storage device 5, which is an example of a storage unit, includes, for example, a hard disk drive, a nonvolatile semiconductor memory, or an optical recording medium and an access device therefor. The storage device 5 stores a high-precision map, which is an example of map information. The high-precision map includes, for example, information indicating road markings, such as lane division lines or stop lines, information indicating signposts, and information indicating buildings or structures near roads (e.g., noise-blocking walls) for each road included in a predetermined region represented in the map. The high-precision map may further include information such as inclinations and altitudes of sections having a predetermined length for each road.

The storage device 5 may further include a processor for executing, for example, a process to update the high-precision map and a process related to a request from the ECU 7 to read out the high-precision map. For example, every time the vehicle 10 moves a predetermined distance, the storage device 5 may transmit the current position of the vehicle 10 and a request to acquire the high-precision map to the map server via the wireless communication device 4, and receive a high-precision map of a predetermined region around the current position of the vehicle 10 from the map server via the wireless communication device 4. When receiving a request from the ECU 7 to read out the high-precision map, the storage device 5 cuts out that portion of the high-precision map stored therein which includes the current position of the vehicle 10 and which represents a region narrower than the predetermined region, and outputs the cut portion to the ECU 7 via the in-vehicle network.

The user interface 6, which is an example of a notifying unit, includes, for example, a display, such as a liquid crystal display, or a touch panel display. The user interface 6 is mounted in the interior of the vehicle 10, e.g., near an instrument panel, so as to face the driver. The user interface 6 displays various types of information received from the ECU 7 via the in-vehicle network to notify the driver of the information. The user interface 6 may further include a speaker mounted in the interior of the vehicle. In this case, the user interface 6 outputs, in the form of a voice signal, various types of information received from the ECU 7 via the in-vehicle network to notify the driver of this information.

The information notified by the user interface 6 to the driver includes, for example, notification information that the driving mode applied to the vehicle 10 will change (e.g., notification information on switching from automated driving mode to manual driving mode or vice versa) or notification information that the driver is required to hold the steering wheel or look ahead.

The ECU 7 determines whether traffic is congested around the vehicle 10. When traffic is congested around the vehicle 10, the ECU 7 sets the driving mode applied to control of the vehicle 10 to automated driving mode and controls travel of the vehicle 10.

As illustrated in FIG. 2, the ECU 7 includes a communication interface 21, a memory 22, and a processor 23. The communication interface 21, the memory 22, and the processor 23 may be separate circuits or a single integrated circuit.

The communication interface 21 includes an interface circuit for connecting the ECU 7 to the in-vehicle network. Every time receiving positioning information from the GPS receiver 2, the communication interface 21 passes the positioning information to the processor 23. Every time receiving an image from the camera 3, the communication interface 21 passes the received image to the processor 23. Additionally, the communication interface 21 passes the high-precision map loaded from the storage device 5 to the processor 23. When receiving notification information from the processor 23, the communication interface 21 outputs the notification information to the user interface 6.

The memory 22, which is another example of a storage unit, includes, for example, volatile and nonvolatile semiconductor memories. The memory 22 stores various types of data used in a vehicle control process executed by the processor 23 of the ECU 7. For example, the memory 22 stores images of surroundings of the vehicle 10, the result of determination of the position of the vehicle, the high-precision map, internal parameters of the camera 3, such as parameters indicating its focal length, angle of view, orientation, and mounted position, and a set of parameters for specifying an object-detecting classifier used for detecting, for example, another vehicle traveling around the vehicle 10. Additionally, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process for the vehicle 10.

Figure 3:
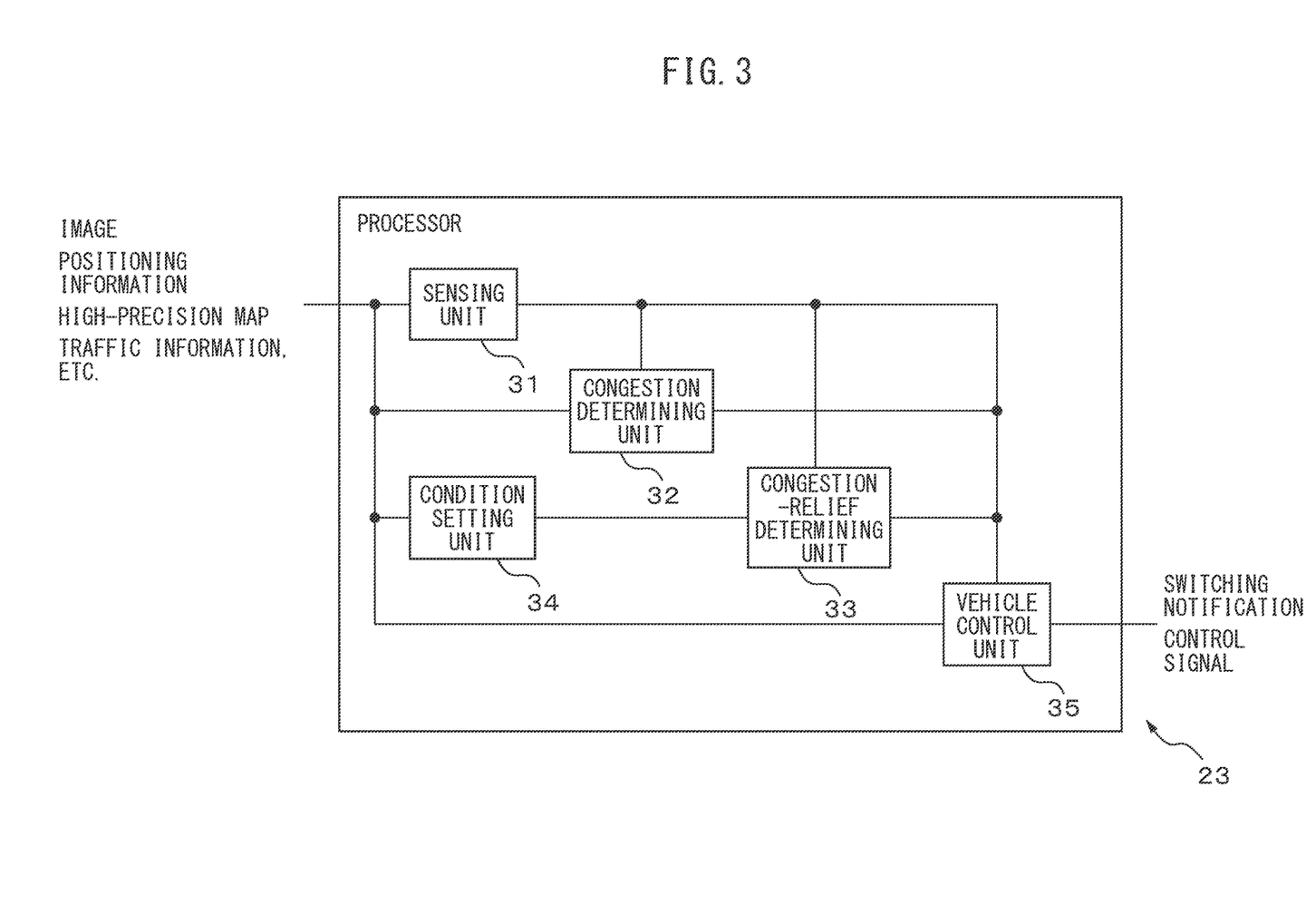
FIG. 3 is a functional block diagram of a processor of the electronic control unit, related to a vehicle control process.

FIG. 3 is a functional block diagram of the processor 23, related to the vehicle control process. The processor 23 includes a sensing unit 31, a congestion determining unit 32, a congestion-relief determining unit 33, a condition setting unit 34, and a vehicle control unit 35. These units included in the processor 23 are, for example, functional modules implemented by a computer program executed on the processor 23, or may be dedicated operating circuits provided in the processor 23.

Every time the ECU 7 acquires an image from the camera 3, the sensing unit 31 senses vehicles around the vehicle 10, based on the acquired image.

For example, every time the ECU 7 acquires an image from the camera 3, the sensing unit 31 inputs the image into a classifier to detect vehicles traveling around the vehicle 10. As such a classifier, the sensing unit 31 may uses, for example, a deep neural network (DNN) having a convolutional neural network (CNN) architecture, such as a Single Shot MultiBox Detector (SSD) or a Faster R-CNN. Such a classifier is trained in advance to detect a sensing-target object around the vehicle 10 (e.g., a vehicle, a road marking, such as a lane division line, and a signpost) from an image. The classifier outputs information specifying an object region including an object sensed in an inputted image and information indicating the type of the sensed object (e.g., a vehicle, a road marking, and a signpost). Thus, every time the ECU 7 acquires an image from the camera 3, the sensing unit 31 stores in the memory 22 information indicating an object region including an object sensed from the image and the type of the sensed object and outputs it to the other units of the processor 23.

The congestion determining unit 32 determines, every predetermined period (e.g., 0.1 to several seconds), whether congestion has occurred around the vehicle 10, in the case that congestion did not occur around the vehicle 10 until the previous predetermined period.

For example, the congestion determining unit 32 determines whether congestion has occurred around the vehicle 10, based on the speed of the vehicle 10 measured by a vehicle speed sensor (not illustrated) mounted on the vehicle 10. In this case, the congestion determining unit 32 determines that congestion has occurred around the vehicle 10, for example, when a state in which a measurement value of the speed of the vehicle 10 acquired from the vehicle speed sensor via the communication interface 21 is not greater than a first speed threshold (e.g., 20 km/h) continues for a first period (e.g., 5 seconds) or more. Alternatively, the congestion determining unit 32 may determine that congestion has occurred around the vehicle 10, when a state in which a measurement value of the speed of the vehicle 10 is not greater than a second speed threshold (e.g., 10 km/h) continues for a second period (e.g., 3 seconds) or more. The second speed threshold is less than the first speed threshold, and the second period is shorter than the first period. Alternatively, the congestion determining unit 32 may determine that congestion has occurred around the vehicle 10, when changes in the measurement value of the speed of the vehicle 10 in a preceding first predetermined period (e.g., 3 seconds) are within a predetermined range of changes in speed (e.g., 1 m/s). In this case, the congestion determining unit 32 may determine that congestion has occurred around the vehicle 10, only when the average of the speed of the vehicle 10 in the first predetermined period is not greater than a predetermined speed. The predetermined speed may be set, for example, at a speed obtained by subtracting a predetermined offset (e.g., 20 km/h to 40 km/h) from the legally permitted speed or the regulation speed of the road on which the vehicle 10 is traveling. In this case, the congestion determining unit 32 may refer to, for example, the high-precision map and the current position of the vehicle 10 indicated by positioning information received from the GPS receiver 2 to identify the legally permitted speed or the regulation speed of the road on which the vehicle 10 is traveling. The congestion determining unit 32 may compare a feature represented in an image obtained by the camera 3 with the high-precision map to estimate the current position and orientation of the vehicle 10. For example, the congestion determining unit 32 temporarily fixes the position and orientation of the vehicle 10, and projects a feature on the road (e.g., a road marking, such as a lane division line or a stop line) detected from an image obtained from the camera 3 onto the high-precision map by referring to internal parameters of the camera 3, or projects a feature on the road around the vehicle 10 in the high-precision map onto the image. The congestion determining unit 32 then assumes the position and orientation of the vehicle 10 for the case that a feature on the road detected from the image best matches with a feature on the road represented in the high-precision map to be the current position of the vehicle 10. In this case, the congestion determining unit 32 may use, for example, that information on the feature sensed from the image, which is received from the sensing unit 31, to estimate the position and orientation of the vehicle 10.

The congestion determining unit 32 may determine that congestion has occurred around the vehicle 10, when the vehicle 10 has stopped for a second predetermined period (e.g., 1 second) or more.

Alternatively, the congestion determining unit 32 may determine whether congestion has occurred around the vehicle 10, based on motion of vehicles traveling around the vehicle 10 and sensed by the sensing unit 31.

The congestion determining unit 32 executes a predetermined tracking process, such as a tracking process using optical flow, on vehicles detected from each of time-series images acquired from the camera 3 to track these vehicles. The congestion determining unit 32 then transforms each image into an aerial image by viewpoint transformation, using internal parameters of the camera 3, to calculate the positions of the tracked vehicles relative to the vehicle 10 at acquisition of each image. The bottom of an object region representing a vehicle is assumed to correspond to the position where this vehicle is in contact with the road surface. Thus, the congestion determining unit 32 may estimate the distance from the vehicle 10 to another vehicle at acquisition of each image, based on the direction from the camera 3 to the position corresponding to the bottom of the object region representing the latter vehicle in each image and on the height of the camera 3 from the road surface, which is one of the internal parameters of the camera 3. The congestion determining unit 32 may use an estimated value of the distance from the vehicle 10 to a tracked vehicle at acquisition of each image to calculate the position of the tracked vehicle relative to the vehicle 10.

Of the tracked vehicles, the congestion determining unit 32 selects a leading vehicle traveling ahead of the vehicle 10. When there are multiple leading vehicles, the congestion determining unit 32 may select one of the leading vehicles closest to the vehicle 10. The congestion determining unit 32 calculates changes in the speed of the leading vehicle relative to the vehicle 10 and changes in the distance between these vehicles in a preceding predetermined period (e.g., 3 to 5 seconds), based on changes in the relative position of the selected leading vehicle in the preceding predetermined period.

Alternatively, in the case that the vehicle 10 includes a distance sensor, such as LiDAR or radar, the congestion determining unit 32 may determine that there is a leading vehicle, when a measurement value of the distance obtained by the distance sensor in a predetermined range of angles ahead of the vehicle 10 (e.g., a range of angles of ±30° parallel to the road surface centered at the travel direction of the vehicle 10) is not greater than a predetermined value. The congestion determining unit 32 may calculate changes in the speed of the leading vehicle relative to the vehicle 10 and changes in the distance between these vehicles in the preceding predetermined period, based on changes in the measurement value of the distance obtained by the distance sensor in the preceding predetermined period.

The congestion determining unit 32 determines that congestion has occurred around the vehicle 10, when the absolute value of the speed of the leading vehicle relative to the vehicle 10 is not greater than a predetermined relative-speed threshold (e.g., 1 m/s) and the distance between the vehicle 10 and the leading vehicle is within a predetermined distance range (e.g., not less than 3 m nor more than 25 m) over the preceding predetermined period.

Alternatively, for each of the tracked vehicles, the congestion determining unit 32 may calculate changes in the speed of the tracked vehicle relative to the vehicle 10 and changes in the distance between these vehicles in the preceding predetermined period. The congestion determining unit 32 may determine that congestion has occurred around the vehicle 10, when the speed of every tracked vehicle relative to the vehicle 10 is not greater than a predetermined relative-speed threshold (e.g., 3 m/s) over the preceding predetermined period. Of the tracked vehicles, the congestion determining unit 32 may use only vehicles traveling on a lane adjoining the travel lane of the vehicle 10 (hereafter simply an "adjoining lane") for determination of congestion. In this case, for example, the congestion determining unit 32 may determine that one of the tracked vehicles on the side opposite to the vehicle 10 with respect to a lane division line detected by a classifier is a vehicle traveling on an adjoining lane. Alternatively, the congestion determining unit 32 may determine that one of the tracked vehicles separated from a line along the travel direction of the vehicle 10 more than a lane width is a vehicle traveling on an adjoining lane.

Alternatively, the congestion determining unit 32 may determine that congestion has occurred around the vehicle 10, when traffic information received via the wireless communication device 4 indicates occurrence of congestion in the road on which the vehicle 10 is traveling. In this case, the congestion determining unit 32 may refer to the current position of the vehicle 10 and the high-precision map to identify the road on which the vehicle 10 is traveling.

Alternatively, the congestion determining unit 32 may determine that congestion has occurred around the vehicle 10, only when it is determined so by two or more of the above-described techniques for determination of congestion.

When determining that congestion has occurred around the vehicle 10, the congestion determining unit 32 notifies the result of determination to the condition setting unit 34, the congestion-relief determining unit 33, and the vehicle control unit 35.

After the notification of occurrence of congestion around the vehicle 10 from the congestion determining unit 32, the congestion-relief determining unit 33 determines, every predetermined period, whether congestion is relieved around the vehicle 10, based on motion of vehicles traveling around the vehicle 10 and sensed from an image obtained by the camera 3.

For example, the congestion-relief determining unit 33 determines that congestion is relieved around the vehicle 10, when both of the following two conditions (conditions 1 and 2) are satisfied. These conditions are an example of the congestion relief condition.

(i) Condition 1: the speed of the vehicle 10 is not less than the first speed threshold.
(ii) Condition 2: at least one of the following three optional conditions is satisfied.

Optional condition a: the average of the speeds of one or more vehicles around the vehicle 10 (hereafter simply the "average vehicle speed") is kept not less than the second speed threshold for a first predetermined time or more.

Optional condition b: the average of the accelerations of one or more vehicles around the vehicle 10 (hereafter simply the "average acceleration") is not less than a predetermined acceleration threshold.

Optional condition c: the variance of the speeds of one or more vehicles around the vehicle 10 (hereafter simply the "speed variance") is not greater than a predetermined variance threshold.

The congestion-relief determining unit 33 may use the speed of the vehicle 10 measured by a vehicle speed sensor (not illustrated) mounted on the vehicle 10 as the speed of the vehicle 10 for condition 1. The congestion-relief determining unit 33 can calculate the average vehicle speed, the average acceleration, and the speed variance by executing, for each of the one or more vehicles sensed by the sensing unit 31, the same process as is executed by the congestion determining unit 32. More specifically, the congestion-relief determining unit 33 can track the one or more vehicles sensed by the sensing unit 31 from each of time-series images obtained by the camera 3 to calculate the speeds of the respective vehicles relative to the vehicle 10 at acquisition of each image. Then, the congestion-relief determining unit 33 can calculate the speeds and accelerations of the tracked vehicles at acquisition of each image, based on the speed of the vehicle 10 and the relative speeds of the tracked vehicles at acquisition of each image, and calculate the average speed, the average acceleration, and the speed variance at acquisition of each image, based on the speeds and accelerations of the tracked vehicles. The average speed, the average acceleration, and the speed variance are examples of a motion value indicating motion of vehicles around the vehicle 10.

As will be described in detail below, the first speed threshold, the second speed threshold, the first predetermined time, the acceleration threshold, and the variance threshold, which constitute the congestion relief condition, are set by the condition setting unit 34, based on information indicating road environment around the vehicle 10.

When determining that congestion is relieved, the congestion-relief determining unit 33 notifies the result of determination to the vehicle control unit 35.

After the notification of occurrence of congestion around the vehicle 10 from the congestion determining unit 32, the condition setting unit 34 sets, every predetermined period, the first speed threshold, the second speed threshold, the first predetermined time, the acceleration threshold, and the variance threshold, which constitute the congestion relief condition, based on information indicating road environment around the vehicle 10.

For example, when congestion is caused by a structure of the road that induces congestion, it is highly likely that congestion is relieved near the location causing this congestion (e.g., a merging or branching location, a location of a tollgate or a way in and out facing the road, such as of a way in and out of a freeway or a parking lot, or a location where the road narrows), which will be referred to as the "congestion inducing location" below for convenience of description, or at a location where the road widens in the case of congestion caused by narrowing of the road. For this reason, vehicles that have passed by such a congestion inducing location may accelerate suddenly. Thus, the condition setting unit 34 relaxes the congestion relief condition for the case that a congestion inducing location where a structure of the road induces congestion is located in a predetermined section including the vehicle 10, as compared to the congestion relief condition for the case that the congestion inducing location is outside the predetermined section. More specifically, when the vehicle 10 is traveling near a congestion inducing location, the condition setting unit 34 sets at least one of the second speed threshold, the first predetermined time, and the acceleration threshold or all of them lower than those for the case that the vehicle 10 is not traveling near a congestion inducing location. For example, the condition setting unit 34 refers to the current position of the vehicle 10 and the high-precision map to determine whether a congestion inducing location is included in a first section (e.g., 1 km) extending backward from the current position of the vehicle 10 along the travel direction of the vehicle 10 on the road on which the vehicle 10 is traveling (i.e., a section through which the vehicle 10 has passed). The high-precision map is an example of information indicating road environment around the vehicle 10. When the first section includes a congestion inducing location, the condition setting unit 34 sets at least one of the second speed threshold, the first predetermined time, and the acceleration threshold or all of them lower than those for the case that the first section does not include a congestion inducing location by a predetermined offset. The predetermined offset for the second speed threshold may be, for example, 5 km/h to 15 km/h. For example, when the second speed threshold for the case that the first section does not include a congestion inducing location is 50 km/h, the second speed threshold for the case that the first section includes a congestion inducing location may be 35 km/h to 45 km/h. The predetermined offset for the first predetermined time may be, for example, 1 second to 3 seconds. For example, when the first predetermined time for the case that the first section does not include a congestion inducing location is 5 seconds, the first predetermined time for the case that the first section includes a congestion inducing location may be 2 seconds to 4 seconds. The predetermined offset for the acceleration threshold may be, for example, 0.05 g to 0.1 g where g is the acceleration of gravity. For example, when the acceleration threshold for the case that the first section does not include a congestion inducing location is 0.2 g, the acceleration threshold for the case that the first section includes a congestion inducing location may be 0.1 g to 0.15 g. In this way, the congestion-relief determining unit 33 can early detect relief of congestion in the case that congestion is caused by a structure of the road.

When a branch point of the road, a way out from a freeway or an expressway, or a location where the road widens is located ahead of the vehicle 10, congestion around the vehicle 10 may be relieved at a position upstream of such a location. Thus, regarding these locations, the condition setting unit 34 may set the first section as a section having a predetermined length ahead of and behind the current position of the vehicle 10 (e.g., 1 km ahead of and behind it) along the travel direction of the vehicle 10.

Congestion may be caused by a predetermined event that causes at least part of the road on which the vehicle 10 is traveling to be obstructed. In such a case, it is highly likely that congestion around the vehicle 10 will be relieved immediately after the vehicle 10 passes the location where the predetermined event has occurred (e.g., a location where road construction is carried out, an accident has occurred, or an on-street parking vehicle or a fallen object exists), which will be referred to as an "event location" below for convenience of description. Thus, the condition setting unit 34 inputs, for example, the latest image obtained from the camera 3 into a classifier to determine whether an object, such as a signboard, for making a notification of road construction or occurrence of an accident. As such a classifier, it uses, for example, a DNN having a CNN architecture like the classifier described in relation to the sensing unit 31. When the classifier detects an object for making a notification of road construction or occurrence of an accident in the inputted image, the condition setting unit 34 determines that there is an event location ahead of the vehicle 10. Similarly, the condition setting unit 34 inputs the latest image obtained from the camera 3 into a classifier, and when the classifier detects a fallen object on the road in the inputted image, the condition setting unit 34 may determine that there is a fallen object on the road. Alternatively, as described in relation to the congestion determining unit 32, the condition setting unit 34 may input time-series images obtained from the camera 3 into a classifier to detect vehicles around the vehicle 10, and track the detected vehicles, thereby detecting a vehicle standing still on the road during tracking, i.e., an on-street parking vehicle. When a fallen object or an on-street parking vehicle is detected, the condition setting unit 34 determines that there is an event location ahead of the vehicle 10. The condition setting unit 34 tracks these detected objects, using a technique similar to that described in relation to the congestion determining unit 32, and determines the locations of these objects, i.e., the position of the event location relative to the vehicle 10 every time the latest image is obtained from the camera 3. The condition setting unit 34 then determines whether the vehicle 10 has passed the event location, based on this relative position. Each image obtained from the camera 3 is another example of information indicating road environment around the vehicle 10.

In this case, from when the vehicle 10 passes the event location until it travels a predetermined distance or a predetermined time elapses, the condition setting unit 34 sets at least one of the second speed threshold, the first predetermined time, and the acceleration threshold or all of them lower than those before the vehicle 10 reaches the event location by a predetermined offset. In this way, in the case that congestion is caused by occurrence of an event, the congestion-relief determining unit 33 can early detect relief of congestion after the vehicle 10 passes the event location. The predetermined offset may be equal to or different from the offset for the case that the first section includes a congestion inducing location. In particular, it is supposed that vehicles around the vehicle 10 accelerate suddenly after the vehicle 10 passes an event location. Thus, the offset of the acceleration threshold for the case that the vehicle 10 has passed an event location may be set greater than the offset for the case that the first section includes a congestion inducing location.

Figure 4A:
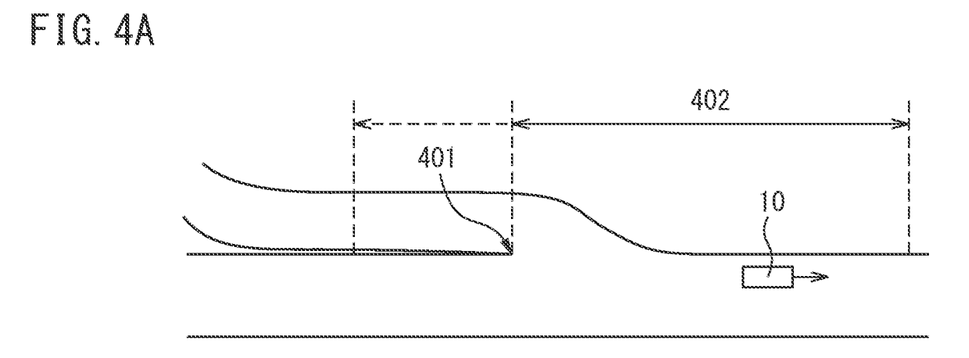
FIG. 4A illustrates an example of a section where at least one of a second speed threshold, a first predetermined time, and an acceleration threshold or all of them are decreased.
Figure 4B:
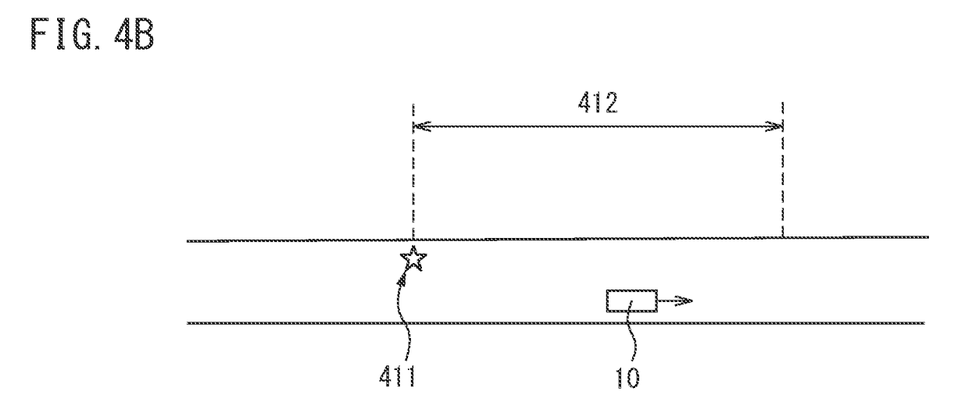
FIG. 4B illustrates an example of a section where at least one of a second speed threshold, a first predetermined time, and an acceleration threshold or all of them are decreased.

FIGS. 4A and 4B each illustrate an example of a section where at least one of the second speed threshold, the first predetermined time, and the acceleration threshold or all of them are decreased.

In the example illustrated in FIG. 4A, when the vehicle 10 traveling in the direction indicated by an arrow is located in a section 402 ahead of a merging location 401 of the road (i.e., when the merging location 401 is included in a section extending backward from the current position of the vehicle 10 and having the same length as the section 402), at least one of the second speed threshold, the first predetermined time, and the acceleration threshold or all of them are decreased. The location 401 is an example of the congestion inducing location. When the location 401 is not a merging location but a branching location, the section 402 may be extended upstream of the location 401 as indicated by a dotted line.

In the example illustrated in FIG. 4B, when the vehicle 10 traveling in the direction indicated by an arrow is located in a section 412 extending forward from a location 411 where an accident has occurred, at least one of the second speed threshold, the first predetermined time, and the acceleration threshold or all of them are decreased. The location 411 is an example of the event location.

When congestion around the vehicle 10 is "natural congestion," it is supposed that vehicles around the vehicle 10 accelerate relatively slowly at relief of congestion around the vehicle 10. Additionally, although congestion has not been relieved, vehicles around the vehicle 10 may momentarily accelerate, depending on changes in degree of congestion around the vehicle 10. Thus, the condition setting unit 34 may set the first speed threshold or the variance threshold or both of them lower than those for the cases that the first section includes a congestion inducing location and that the vehicle 10 has passed an event location, by a predetermined offset. This allows the congestion-relief determining unit 33 to appropriately determine relief of natural congestion around the vehicle 10.

Figure 5:
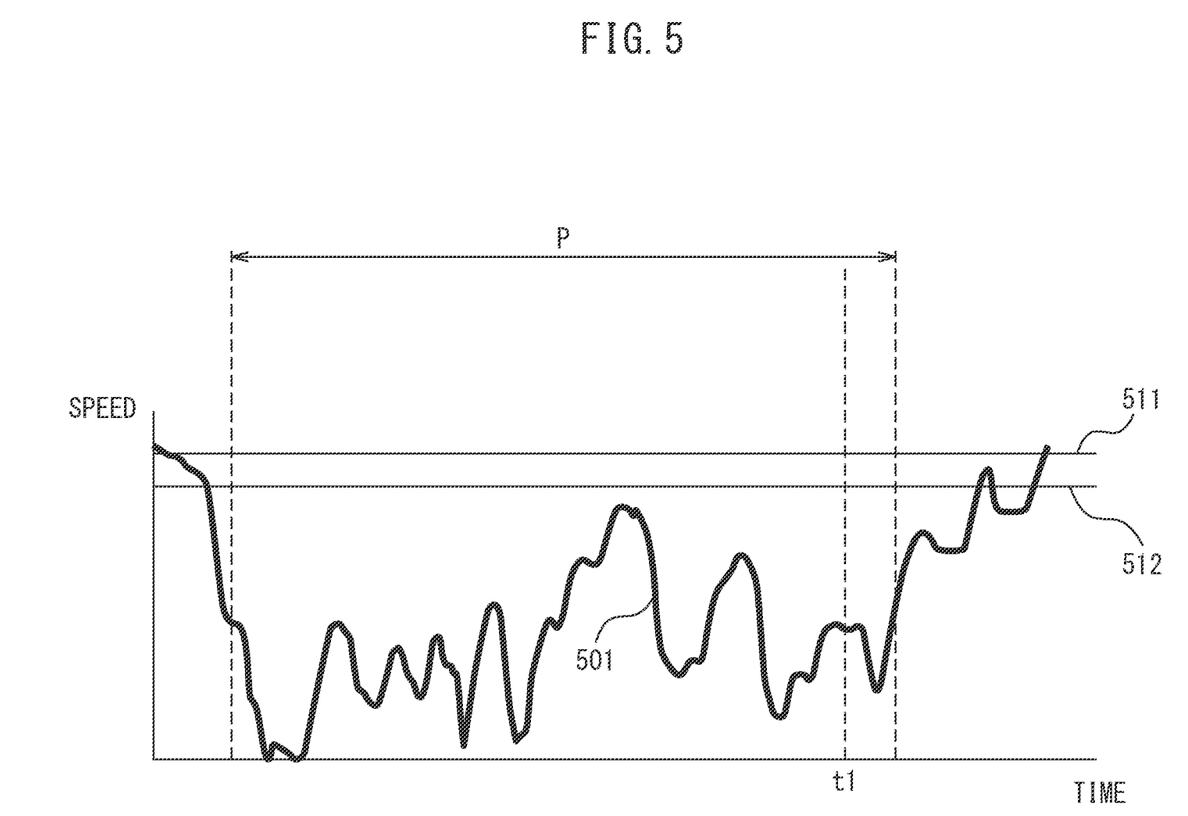
FIG. 5 illustrates an example of changes in average vehicle speed of vehicles around a host vehicle during occurrence of congestion and after relief thereof.

FIG. 5 illustrates an example of changes in average vehicle speed of vehicles around the vehicle 10 during occurrence of congestion and after relief thereof. The abscissa and ordinate of FIG. 5 represent time and speed, respectively. A graph 501 represents time-varying changes in average vehicle speed. In FIG. 5, it is assumed that congestion occurs around the vehicle 10 in period P and is relieved around the vehicle 10 after period P. It is also assumed that the vehicle 10 passes a congestion inducing location at time t1. In this case, the second speed threshold is set at a relatively high value 511 until time t1. For this reason, even if the average vehicle speed temporarily increases during occurrence of congestion, the congestion-relief determining unit 33 does not erroneously determine that congestion is relieved. After time t1, since the congestion inducing location is included in a first section behind the vehicle 10, the second speed threshold is set at a relatively low value 512. For this reason, the average vehicle speed exceeds the second speed threshold at early timing after relief of congestion, allowing the congestion-relief determining unit 33 to early detect relief of congestion around the vehicle 10.

Every time changing the first speed threshold, the second speed threshold, the first predetermined time, the acceleration threshold, or the variance threshold, the condition setting unit 34 notifies the changed values thereof to the congestion-relief determining unit 33.

When notified of occurrence of congestion around the vehicle 10 from the congestion determining unit 32, the vehicle control unit 35 switches the driving mode applied to the vehicle 10 from manual driving mode to automated driving mode. At this switch, the vehicle control unit 35 may cause the user interface 6 to display a message indicating switching the driving mode applied to the vehicle 10 from manual driving mode to automated driving mode or to output a voice of this message, thereby notifying the driver of switching the driving mode. After this notification, the vehicle control unit 35 controls the vehicle 10 so as to automatically drive it.

When notified of relief of congestion around the vehicle 10 from the congestion-relief determining unit 33, the vehicle control unit 35 conversely switches the driving mode applied to the vehicle 10 from automated driving mode to manual driving mode. At this switch, the vehicle control unit 35 causes the user interface 6 to display a message indicating switching the driving mode applied to the vehicle 10 from automated driving mode to manual driving mode or to output a voice of this message, thereby notifying the driver of switching the driving mode. After the elapse of a predetermined period from this notification, the vehicle control unit 35 stops automated driving of the vehicle 10 and thereafter controls travel of the vehicle 10 according to a driver operation. The vehicle control unit 35 may continue automated driving of the vehicle 10 until receiving a signal indicating that the steering wheel is held from a touch sensor (not illustrated) provided on the steering wheel.

While automated driving mode is applied to the vehicle 10, the vehicle control unit 35 generates one or more planned trajectories of the vehicle 10 in the nearest predetermined section (e.g., 500 m to 1 km) so that the vehicle 10 will travel along a planned travel route to a destination. Each planned trajectory is represented, for example, as a set of target locations of the vehicle 10 at respective time points during travel of the vehicle 10 through the predetermined section. The vehicle control unit 35 controls components of the vehicle 10 so that the vehicle 10 will travel along the planned trajectory.

The vehicle control unit 35 generates a planned trajectory so that the vehicle 10 will not collide with objects around the vehicle 10 (e.g., other vehicles) detected from time-series images obtained by the camera 3. For example, the vehicle control unit 35 tracks the objects detected by the sensing unit 31 as described in relation to the congestion determining unit 32 and the congestion-relief determining unit 33. When the congestion-relief determining unit 33 tracks the sensed objects, the vehicle control unit 35 may use the result of tracking by the congestion-relief determining unit 33. The vehicle control unit 35 predicts trajectories of the respective objects to a predetermined time ahead from the trajectories obtained from the result of tracking. To this end, the vehicle control unit 35 can estimate the positions of the detected objects at acquisition of each image, using the current position and orientation of the vehicle 10, estimated distances to the detected objects, and the directions from the vehicle 10 to the objects at acquisition of each image. The position and orientation of the vehicle 10 at acquisition of each image may be estimated by comparing the image obtained by the camera 3 with the high-precision map, as described in relation to the congestion determining unit 32. The vehicle control unit 35 can predict trajectories of the detected objects, using, for example, a Kalman filter or a particle filter to execute a tracking process on the estimated positions of the objects at acquisition of each image.

The vehicle control unit 35 generates a planned trajectory of the vehicle 10, based on the predicted trajectories of the tracked objects, so that a predicted distance between the vehicle 10 and any of the objects will be not less than a predetermined distance until a predetermined time ahead. To this end, the vehicle control unit 35 may set a planned trajectory so that the speed of the vehicle 10 will not exceed a predetermined upper-limit speed.

The vehicle control unit 35 may generate multiple planned trajectories. In this case, the vehicle control unit 35 may select one of the planned trajectories such that the sum of the absolute values of acceleration of the vehicle 10 is the smallest.

Upon setting a planned trajectory, the vehicle control unit 35 controls components of the vehicle 10 so that the vehicle 10 will travel along the planned trajectory. For example, the vehicle control unit 35 determines a target acceleration of the vehicle 10 according to the planned trajectory and the current speed of the vehicle 10 measured by a vehicle speed sensor (not illustrated), and sets the degree of accelerator opening or the amount of braking so that the acceleration of the vehicle 10 will be equal to the target acceleration. The vehicle control unit 35 then determines the amount of fuel injection according to the set degree of accelerator opening, and outputs a control signal depending on the amount of fuel injection to a fuel injector of the engine of the vehicle 10. Alternatively, the vehicle control unit 35 outputs a control signal depending on the set amount of braking to the brake of the vehicle 10.

When changing the course of the vehicle 10 in order for the vehicle 10 to travel along the planned trajectory, the vehicle control unit 35 determines the steering angle of the vehicle 10 according to the planned trajectory and outputs a control signal depending on the steering angle to an actuator (not illustrated) controlling the steering wheel of the vehicle 10.

Figure 6:
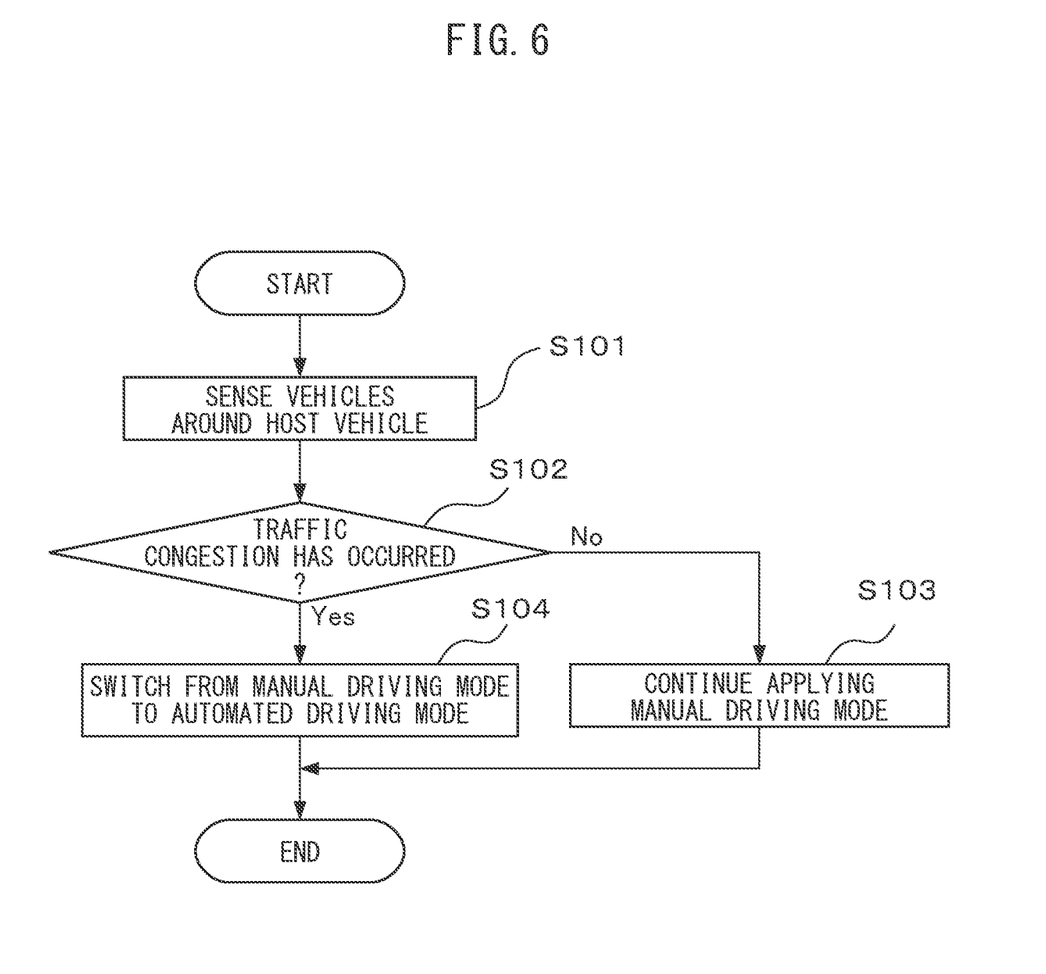
FIG. 6 is an operation flowchart of the vehicle control process related to switching from manual driving mode to automated driving mode.

FIG. 6 is an operation flowchart of the vehicle control process executed by the processor 23, related to switching from manual driving mode to automated driving mode. While manual driving mode is applied to the vehicle 10, the processor 23 may execute the vehicle control process related to switching from manual driving mode to automated driving mode in accordance with the following operation flowchart every predetermined period.

The sensing unit 31 of the processor 23 senses vehicles around the vehicle 10 (step S101). The congestion determining unit 32 of the processor 23 determines whether congestion has occurred around the vehicle 10, based on motion of the vehicle 10, motion of vehicles around the vehicle 10, or received traffic information (step S102). In the case that congestion has not occurred around the vehicle 10 (No in Step S102), the vehicle control unit 35 of the processor 23 continues applying manual driving mode (step S103). In the case that congestion has occurred around the vehicle 10 (Yes in Step S102), the vehicle control unit 35 switches the applied driving mode from manual driving mode to automated driving mode (step S104). After this switch, the vehicle control unit 35 controls the vehicle 10 so as to automatically drive it. After step S103 or S104, the processor 23 terminates the vehicle control process related to switching from manual driving mode to automated driving mode.

Figure 7:
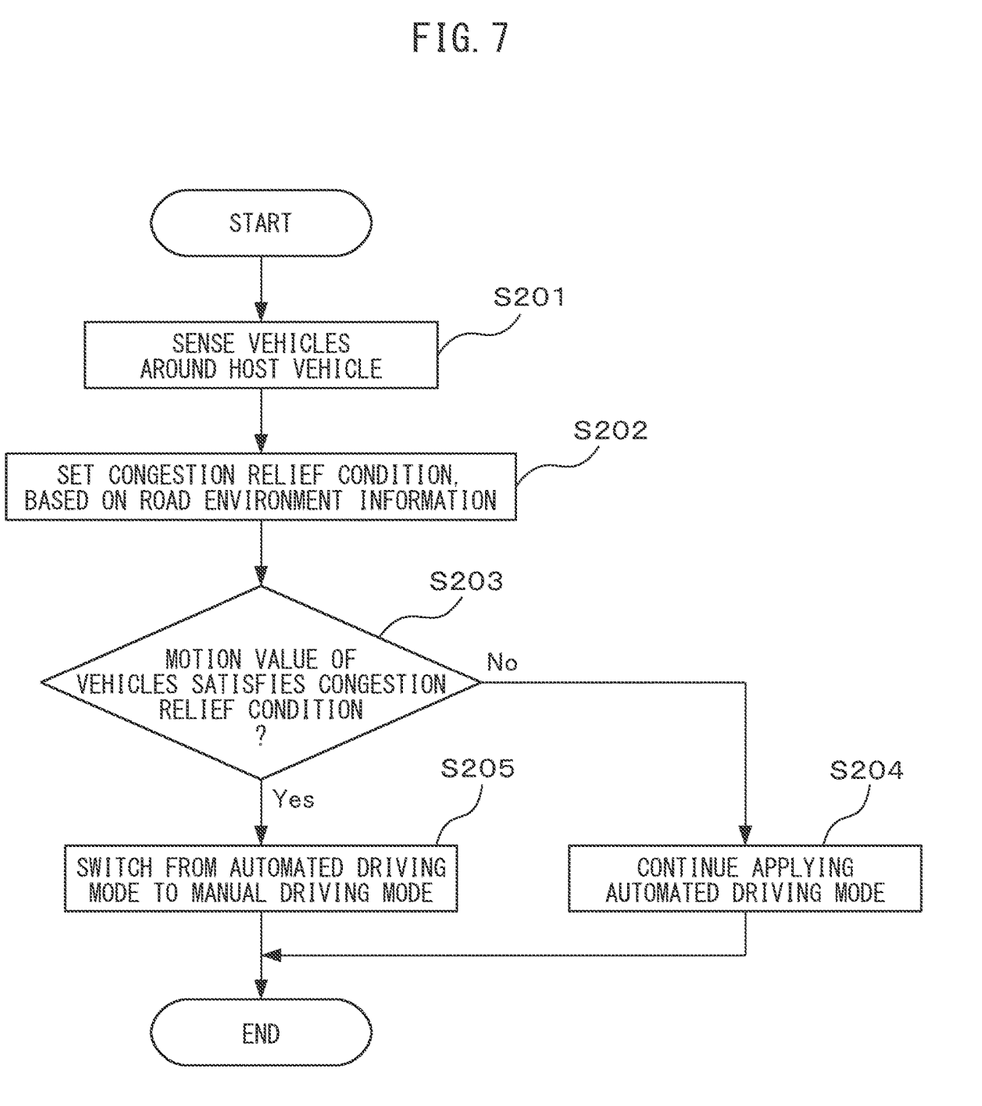
FIG. 7 is an operation flowchart of the vehicle control process related to switching from automated driving mode to manual driving mode.

FIG. 7 is an operation flowchart of the vehicle control process executed by the processor 23, related to switching from automated driving mode to manual driving mode. While automated driving mode is applied to the vehicle 10, the processor 23 may execute the vehicle control process related to switching from automated driving mode to manual driving mode in accordance with the following operation flowchart every predetermined period.

The sensing unit 31 of the processor 23 senses vehicles around the vehicle 10 (step S201). The condition setting unit 34 of the processor 23 sets a congestion relief condition, based on the current position of the vehicle 10 and road environment information, such as the high-precision map or images obtained by the camera 3 (step S202). The processor 23 may change the order of the processes of steps S201 and S202, or execute the processes of steps S201 and S202 in parallel.

The congestion-relief determining unit 33 of the processor 23 calculates a motion value indicating motion of vehicles around the vehicle 10, such as an average vehicle speed or an average acceleration, and determines whether the motion value satisfies the congestion relief condition (step S203). When the motion value does not satisfy the congestion relief condition (No in Step S203), the vehicle control unit 35 continues applying automated driving mode (step S204).

When the motion value satisfies the congestion relief condition (Yes in Step S203), the vehicle control unit 35 switches the applied driving mode from automated driving mode to manual driving mode (step S205). After this switch, the vehicle control unit 35 stops automated driving of the vehicle 10. After step S204 or S205, the processor 23 terminates the vehicle control process related to switching from automated driving mode to manual driving mode.

As has been described above, the vehicle controller controls the host vehicle so as to automatically drive the vehicle while traffic is congested around the vehicle. Upon relief of congestion around the vehicle, the vehicle controller switches the driving mode applied to the vehicle from automated driving mode to manual driving mode. To this end, the vehicle controller sets a congestion relief condition that a motion value indicating motion of vehicles around the host vehicle should satisfy when congestion is relieved, based on information indicating road environment around the host vehicle. This allows the vehicle controller to appropriately determine whether congestion is relieved. As a result, the vehicle controller can inhibit the situation that a condition of vehicle control applied during occurrence of congestion, such as an upper-limit speed, is kept applied despite relief of congestion and prevents the host vehicle from following vehicles therearound. Additionally, the vehicle controller can prevent erroneous determination that congestion is relieved, because it sets the congestion relief condition depending on road environment around the host vehicle. For this reason, the vehicle controller can inhibit frequent switching between the state of determination that traffic is congested and the state of determination that congestion is relieved and frequent occurrence of transfer of control between automated driving control and manual driving control. As a result, the vehicle controller can prevent frequent request for transferring vehicle operation to the driver, allowing for lightening the driver's load.

According to a modified example, the condition setting unit 34 may set the congestion relief condition for the case that the vehicle 10 is descending a slope so as to reduce the possibility of determination that congestion is relieved as compared to the congestion relief condition at normal times. For example, the condition setting unit 34 may set the second speed threshold or the acceleration threshold or both of them for the case that the vehicle 10 is descending a slope at values higher than those mentioned in the embodiment, which are set depending on road environment around the vehicle 10, by a predetermined offset. This allows for inhibiting the congestion-relief determining unit 33 from erroneously determining that congestion is relieved around the vehicle 10, even if the speeds of vehicles around the vehicle 10 temporarily increase due to the downward slope. The condition setting unit 34 may refer to the current position and the travel direction of the vehicle 10 and the high-precision map to determine whether the vehicle 10 is descending a slope. The condition setting unit 34 can identify the travel direction of the vehicle 10, based on, for example, the planned travel route of the vehicle 10 obtained by a navigation device, the latest results of measurement of the position of the vehicle 10, or a result of measurement of a bearing obtained by a compass mounted on the vehicle 10. Additionally, the steeper the inclination of the downward slope, the greater the condition setting unit 34 may set the predetermined offset for the second speed threshold or the acceleration threshold or both of them. To this end, the condition setting unit 34 may refer to the high-precision map to determine the inclination of the downward slope at the current position of the vehicle 10.

The condition setting unit 34 may set the congestion relief condition for the case that the number of tracked vehicles traveling around the vehicle 10 (hereafter, the "number of tracked vehicles") is not greater than a predetermined threshold number so as to reduce the possibility of determination that congestion is relieved as compared to the congestion relief condition at normal times. For example, the condition setting unit 34 may set at least one of the second speed threshold, the first predetermined time, and the acceleration threshold or all of them for the case that the number of tracked vehicles is not greater than the threshold number at values higher than those mentioned in the embodiment, which are set depending on road environment around the vehicle 10, by a predetermined offset. This allows for inhibiting the congestion-relief determining unit 33 from erroneously determining that congestion is relieved around the vehicle 10, even if the number of vehicles traveling around the vehicle 10 is small.

According to another modified example, depending on the type of road on which the vehicle 10 is traveling, the congestion-relief determining unit 33 may determine that congestion is relieved around the vehicle 10 when the condition related to motion of other vehicles in the embodiment (i.e., condition 2) is satisfied, regardless of whether the condition related to the speed of the vehicle 10 (i.e., condition 1) is satisfied. For example, in the case that the regulation speed of the road on which the vehicle 10 is traveling is not greater than a predetermined speed, the congestion-relief determining unit 33 may determine that congestion is relieved around the vehicle 10 when the condition related to motion of other vehicles is satisfied.

According to still another modified example, at determination of congestion and relief thereof, the congestion determining unit 32 and the congestion-relief determining unit 33 may omit to refer to, of vehicles around the vehicle 10, vehicles going toward a service area or a parking area. This allows the congestion determining unit 32 and the congestion-relief determining unit 33 to more correctly determine whether congestion has occurred around the vehicle 10 and whether congestion is relieved around the vehicle 10. In this case, the congestion determining unit 32 and the congestion-relief determining unit 33 may refer to the trajectories of the tracked vehicles and the high-precision map to determine whether these trajectories are on a branch route toward a service area or a parking area, and determine that vehicles whose trajectories are on the branch route are vehicles going toward a service area or a parking area.

Similarly, at determination of congestion and relief thereof, the congestion determining unit 32 and the congestion-relief determining unit 33 may omit to refer to vehicles traveling on a lane differing from the travel lane of the vehicle 10 and branching from the road including the travel lane of the vehicle 10 (hereafter, a "branch lane"). Additionally, at determination of congestion and relief thereof, the congestion determining unit 32 and the congestion-relief determining unit 33 may omit to refer to vehicles traveling on a lane on which only vehicles of a particular type are allowed to travel (hereafter, a "vehicle-type limited lane"), such as a bus lane, a high-occupancy vehicle (HOV) lane, or an express lane. Since the degree of congestion on a branch lane or a vehicle-type limited lane may differ from that on the travel lane of the vehicle 10, omission of use of vehicles traveling on a branch lane or a vehicle-type limited lane for determination of congestion and relief thereof allows the congestion determining unit 32 and the congestion-relief determining unit 33 to more correctly determine whether congestion has occurred around the vehicle 10 and whether congestion is relieved around the vehicle 10. In this case also, in the same manner as described above, the congestion determining unit 32 and the congestion-relief determining unit 33 may refer to the trajectories of the tracked vehicles and the high-precision map to determine whether these trajectories are on a branch lane, and determine that vehicles whose trajectories are on the branch lane are vehicles traveling on a branch lane. Similarly, the congestion determining unit 32 and the congestion-relief determining unit 33 may determine whether the trajectories of the tracked vehicles are on a vehicle-type limited lane, and determine that vehicles whose trajectories are on the vehicle-type limited lane are vehicles traveling on a vehicle-type limited lane.

The congestion determining unit 32 and the congestion-relief determining unit 33 may omit to refer to, of vehicles traveling around the vehicle 10, a two-wheeler and an emergency vehicle at determination of congestion and relief thereof. This is because a two-wheeler and an emergency vehicle may travel at a certain speed even if traffic is congested around the vehicle 10. In this case, the congestion determining unit 32 and the congestion-relief determining unit 33 may exclude, of the vehicles detected by inputting an image into a classifier, vehicles whose type is a two-wheeler or an emergency vehicle to calculate the average vehicle speed and the like.

According to yet another modified example, the vehicle control unit 35 may decrease the level of automated driving control applied to the vehicle 10 for the case that congestion is relieved around the vehicle 10 as compared to the level thereof for the case that traffic is congested around the vehicle 10. For example, when congestion is relieved around the vehicle 10, the vehicle control unit 35 may continue automated driving control of the vehicle 10 on condition that the driver is looking ahead of the vehicle 10. In this case, the vehicle control unit 35 may detect, for example, the looking direction of the driver from an in-vehicle image obtained from a driver monitoring camera (not illustrated) provided in the interior of the vehicle 10 so as to capture the driver's head, thereby determining whether the driver is looking ahead of the vehicle 10. For this purpose, the vehicle control unit 35 may detect, for example, a driver's pupil and a reflected image of a light source for illuminating the driver on the cornea (Purkinje image) from an in-vehicle image, and detect the looking direction of the driver, based on the positional relationship between the centroid of the pupil and the Purkinje image.

Alternatively, when congestion is relieved around the vehicle 10, the vehicle control unit 35 may automatically control the speed of the vehicle 10 so as to keep the distance between the vehicle 10 and a vehicle traveling ahead of the vehicle 10 constant. However, in this case, the vehicle control unit 35 controls the travel direction of the vehicle 10 according to the driver operation of the steering wheel.

A computer program for achieving the functions of the processor 23 of the ECU 7 according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. A vehicle controller for automated driving control of a host vehicle located in traffic congestion, the vehicle controller comprising a processor configured to:
   sense at least one non-host vehicle around the host vehicle, based on a sensor signal obtained by a sensor for sensing a situation around the host vehicle, the sensor being mounted on the host vehicle;
   calculate a motion value indicating motion of the sensed at least one non-host vehicle;
   determine, when the motion value satisfies a congestion relief condition, that the traffic congestion is relieved around the host vehicle; and
   set the congestion relief condition, based on road environment information indicating environment of a road around the host vehicle, wherein
   the road environment information includes information identifying a congestion inducing location that is a cause of the traffic congestion in which the host vehicle is currently located,
   the processor, based on a current position of the host vehicle, (i) sets the congestion relief condition to a first threshold value when the current position of the host vehicle is in a first section of the traffic congestion that includes the congestion inducing location and at least a portion of a travel path downstream of the congestion inducing location in a travelling direction of the host vehicle, and (ii) sets the congestion relief condition to a second threshold value when the current position of the host vehicle is in a second section of the traffic congestion located upstream of the first section in the travelling direction of the host vehicle, and
   the first threshold value is less than the second threshold value so that the congestion relief condition set to the first threshold value is relaxed compared to the congestion relief condition set to the second threshold value.

2. The vehicle controller according to claim 1, wherein the road environment information includes information indicating a structure of a road around the host vehicle, and
   the congestion inducing location is a location where the structure of the road induces the traffic congestion.

3. The vehicle controller according to claim 2, wherein the congestion inducing location is a location where the road merges or branches, a location of a way in and out or of a tollgate facing the road, or a location where the road widens.

4. The vehicle controller according to claim 1, wherein the congestion inducing location is an event location, and the first section is a predetermined distance extending downstream from the event location in the travelling direction of the host vehicle or a predetermined time that elapses from a time at which the host vehicle passes the event location.

5. The vehicle controller according to claim 1, wherein the processor calculates, as the motion value, an average of vehicle speeds or accelerations of the sensed at least one non-host vehicle, and determines that the congestion relief condition is satisfied, when the average of the vehicle speeds is kept at or above a predetermined speed threshold for a predetermined time or more or when the average of the accelerations is at or above a predetermined acceleration threshold, and wherein (a) the first and second threshold values are different values for one or both of the predetermined speed threshold and the predetermined time when the motion value is the average of the vehicle speeds of the sensed at least one non-host vehicle, and (b) the first and second threshold values are different values for the predetermined acceleration threshold when the motion value is the average of the vehicle accelerations of the sensed at least one non-host vehicle.

6. A method for automated driving control of a host vehicle located in traffic congestion, the method being executed by a hardware processor and comprising:
   sensing at least one non-host vehicle around the host vehicle, based on a sensor signal obtained by a sensor for sensing a situation around the host vehicle, the sensor being mounted on the host vehicle;

calculating a motion value indicating motion of the sensed at least one non-host vehicle;

determining, when the motion value satisfies a congestion relief condition, that the traffic congestion is relieved around the host vehicle; and setting the congestion relief condition, based on road environment information indicating environment of a road around the host vehicle, wherein the road environment information includes information identifying a congestion inducing location that is a cause of the traffic congestion in which the host vehicle is currently located, the hardware processor, based on a current position of the host vehicle, (i) sets the congestion relief condition to a first threshold value when the current position of the host vehicle is in a first section of the traffic congestion that includes the congestion inducing location and at least a portion of a travel path downstream of the congestion inducing location in a travelling direction of the host vehicle, and (ii) sets the congestion relief condition to a second threshold value when the current position of the host vehicle is in a second section of the traffic congestion located upstream of the first section in the travelling direction of the host vehicle, and the first threshold value is less than the second threshold value so that the congestion relief condition set to the first threshold value is relaxed compared to the congestion relief condition set to the second threshold value.

7. The vehicle controller according to claim 1, wherein the processor switches the host vehicle (a) to an automated driving mode in which the processor controls travel of the host vehicle when the processor determines that the host vehicle is located in the traffic congestion, and (b) to a manual driving mode in which a driver of the host vehicle controls the travel of the host vehicle when the processor determines that the traffic congestion is relieved around the host vehicle.

8. The method according to claim 6, wherein the road environment information includes information indicating a structure of a road around the host vehicle, and
the congestion inducing location is a location where the structure of the road induces the traffic congestion.

9. The method according to claim 8, wherein the congestion inducing location is a location where the road merges or branches, a location of a way in and out or of a tollgate facing the road, or a location where the road widens.

10. The method according to claim 6, wherein the congestion inducing location is an event location, and the first section is a predetermined distance extending downstream from the event location in the travelling direction of the host vehicle or a predetermined time that elapses from a time at which the host vehicle passes the event location.

11. The method according to claim 6, wherein the hardware processor calculates, as the motion value, an average of vehicle speeds or accelerations of the sensed at least one non-host vehicle, and determines that the congestion relief condition is satisfied, when the average of the vehicle speeds is kept at or above a predetermined speed threshold for a predetermined time or more or when the average of the accelerations is at or above a predetermined acceleration threshold, and wherein (a) the first and second threshold values are different values for one or both of the predetermined speed threshold and the predetermined time when the motion value is the average of the vehicle speeds of the sensed at least one non-host vehicle, and (b) the first and second threshold values are different values for the predetermined acceleration threshold when the motion value is the average of the vehicle accelerations of the sensed at least one non-host vehicle.

12. The method according to claim 6, wherein
the hardware processor switches the host vehicle (a) to an automated driving mode in which the hardware processor controls travel of the host vehicle when the hardware processor determines that the host vehicle is located in the traffic congestion, and (b) to a manual driving mode in which a driver of the host vehicle controls the travel of the host vehicle when the hardware processor determines that the traffic congestion is relieved around the host vehicle.

* * * * *